Oct. 21, 1958    T. B. MURRAY    2,857,234
MULTI-CHART COURSE INDICATING APPARATUS
Filed Feb. 17, 1954    9 Sheets-Sheet 1

INVENTOR
Thomas Brian Murray
BY George H. Carey
ATTORNEY

Oct. 21, 1958 T. B. MURRAY 2,857,234
MULTI-CHART COURSE INDICATING APPARATUS
Filed Feb. 17, 1954 9 Sheets-Sheet 2

INVENTOR
Thomas Brian Murray
BY George H. Carley
ATTORNEY

Oct. 21, 1958  T. B. MURRAY  2,857,234
MULTI-CHART COURSE INDICATING APPARATUS
Filed Feb. 17, 1954  9 Sheets-Sheet 3

INVENTOR
Thomas Brian Murray
BY George H. Carey
ATTORNEY

Oct. 21, 1958 T. B. MURRAY 2,857,234
MULTI-CHART COURSE INDICATING APPARATUS
Filed Feb. 17, 1954 9 Sheets-Sheet 6

INVENTOR
Thomas Brian Murray
BY *George H. Corey*
ATTORNEY

Oct. 21, 1958 T. B. MURRAY 2,857,234
MULTI-CHART COURSE INDICATING APPARATUS
Filed Feb. 17, 1954 9 Sheets-Sheet 9

INVENTOR
Thomas Brian Murray
BY George H. Corey
ATTORNEY

United States Patent Office 2,857,234
Patented Oct. 21, 1958

2,857,234

MULTI-CHART COURSE INDICATING APPARATUS

Thomas Brian Murray, London, England, assignor to Communications Patents Limited, London, England Application February 17, 1954, Serial No. 410,948

Claims priority, application Great Britain March 3, 1953

21 Claims. (Cl. 346—8)

This invention is concerned with the art of navigation and relates to course-indicating or course-recording apparatus for use in respect of the movement of a craft, such movement being either that of a real craft or the assumed movement of a synthetic or simulation craft of navigational training equipment. It is to be understood that the indication of the course may in some cases be in the form of a permanent or semi-permanent record and that the word "indicating" is used herein in the broadest sense and is to include such recording.

A known form of such apparatus includes a support for an appropriate navigational chart and means whereby said chart and an indicating element have relative movement as a function of the movement of the craft concerned within the area represented on said chart; the object of such relative movement being to obtain an indication, which may be a recording, with respect to the surface of said chart of the path of the craft in said area.

In view of the speed of modern craft, particularly aircraft, it is sometimes desirable that an indication or recording be made with respect to different charts in rapid succession or even simultaneously. This is the case when a craft leaves the area which is represented on a first chart or, as another example, the craft enters a predetermined area which is of such interest that it is advantageous to obtain a detailed indication or record of the course of the craft within this particular area on a second and larger-scale chart. To meet this requirement in a satisfactory manner it is proposed to employ at least one additional course-indicating arrangement which can be reserved for a chart of an area into which the craft is likely to pass and it is an object of the invention to provide multi-chart course-indicating apparatus which incorporates means whereby the movement of the craft concerned from an area which is represented on a first chart into a predetermined area which is represented on a second chart determines the commencement of the course-indicating function with respect to said second chart.

Another object of the invention is to provide a multi-chart course-indicating apparatus which incorporates means such that, when the craft concerned enters a predetermined area, which is represented on a second chart, the indicating element pertaining to said chart has the correct positional relationship with respect to said chart to ensure that, when the said element commences to perform its allotted function it will be in substantial register with the position on the chart which is representative of the prevailing position of the craft in said area.

A further object of the invention is to provide a multi-chart course-indicating apparatus in which the co-ordination of the operation of two course indicating arrangements is such that the course of the craft concerned will continue to be indicated or recorded when it moves from an area represented on a first chart into an adjacent predetermined area represented on a second chart and such course-indicating or recording will continue even if eventually, the craft returns to the area represented on the first chart.

The invention provides a multi-chart apparatus for indicating the course of a craft which may pass from an area represented on a first chart into a predetermined area represented on a second chart (and which may also be represented on the first chart). The apparatus includes separate supports for the first and second charts and a separate indicating element co-operating with each chart; translating means, responsive to data representing the movement of the craft, cause relative displacement of the indicating elements and their respective chart supports. The apparatus further includes computing means, also responsive to the data representing the movement of the craft, for providing further data representing the position of the craft with respect to the area represented on the second chart. In addition, means are provided, operating under the control of the computing means, for maintaining the indicating element associated with the second chart on the boundary of the latter until the craft moves into the area represented on the second chart, and thereafter initiating relative movement of the second chart support and its indicating element, under the control of the translating means, such as to indicate movement of the craft into the said area.

A number of embodiments of the invention will now be described, by way of example only, with reference to the accompanying drawings. These embodiments are particularly applicable for use in association with a flight simulator, for recording the assumed ground path of an aircraft, but it is to be understood that they are also applicable to the indication or recording of the movement or the assumed movement of any craft, for example a marine vessel.

Figure 4:
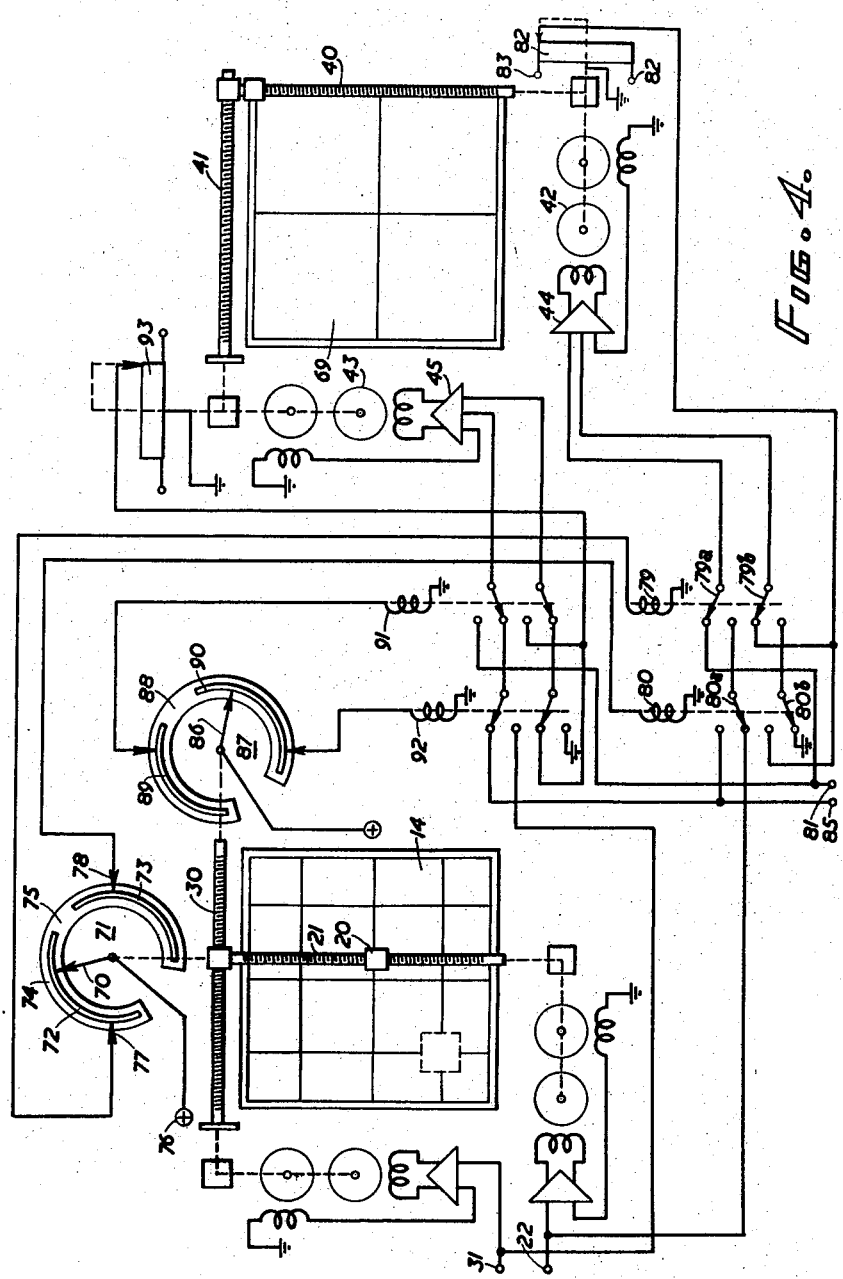
Figure 5:
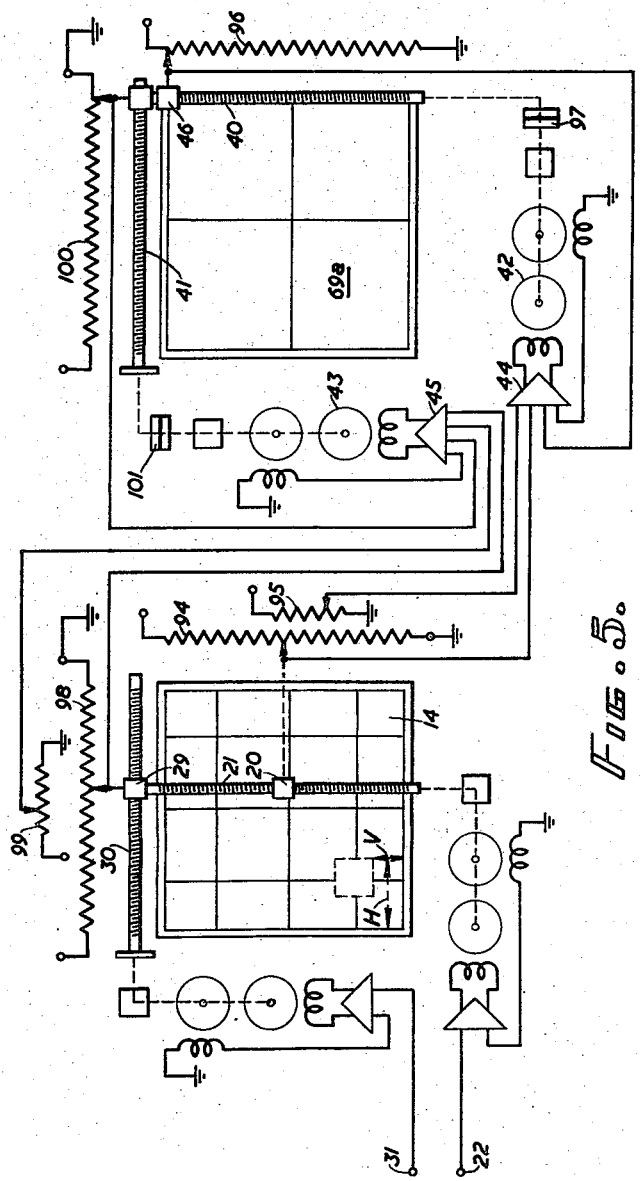

Figs. 4 and 5 respectively, show alternative embodiments of the invention for use when the second chart represents to a larger scale an area represented on the first chart.

Figure 6:
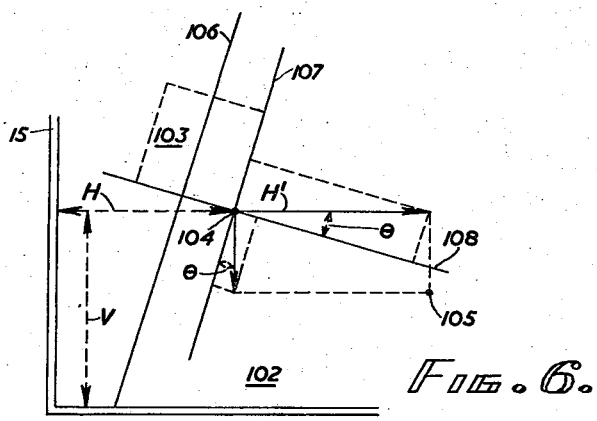
Figure 7:
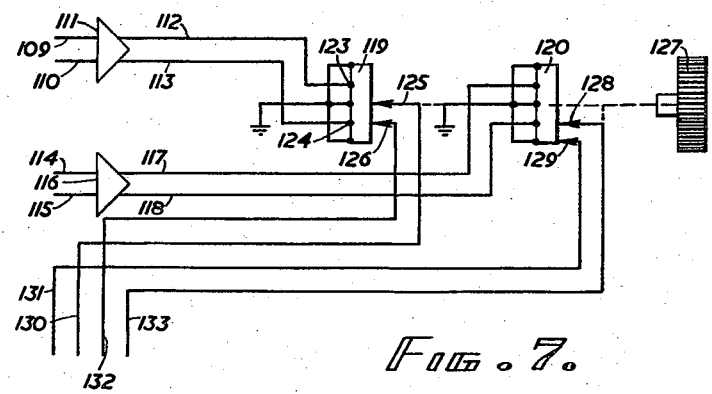

Fig. 6 is a diagram illustrating the operation of the apparatus of Figure 7.

Fig. 7 shows a modification of the apparatus of Figure 5.

Figure 8:
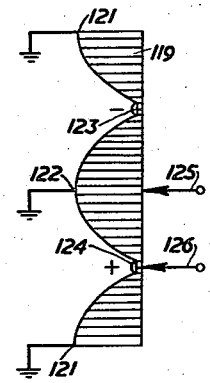

Fig. 8 illustrates diagrammatically a sine-cosine potentiometer of the kind used in the apparatus of Figure 7.

Figure 9:
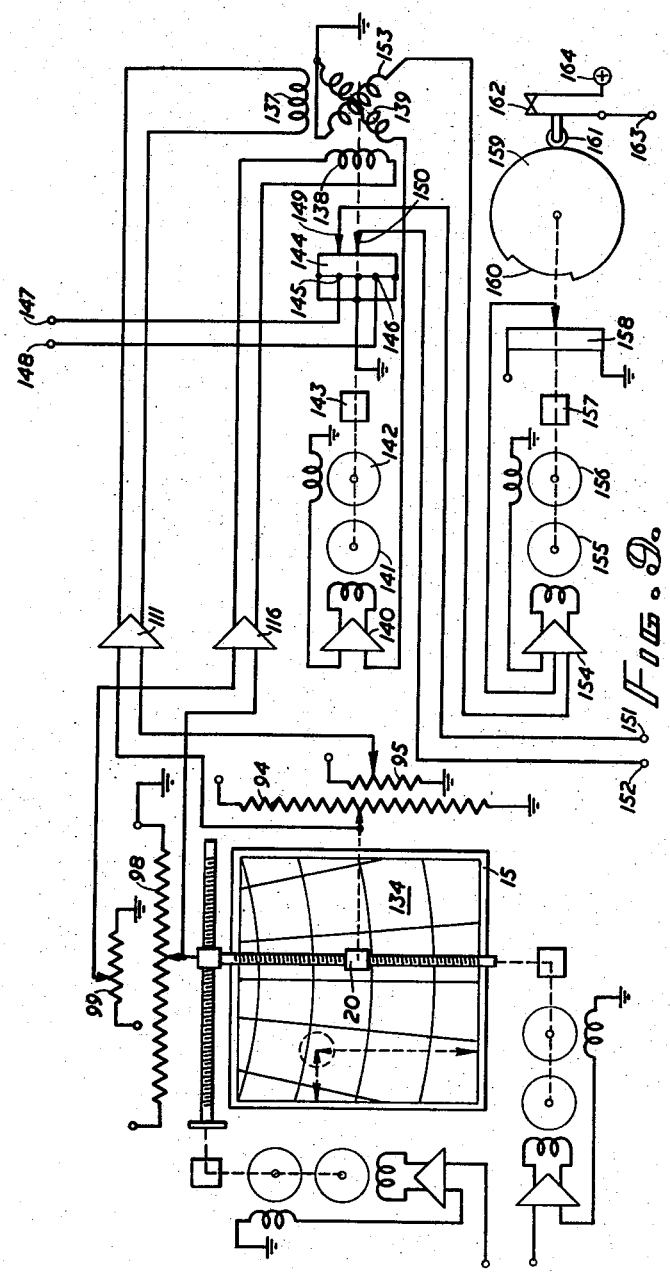
Figure 10:
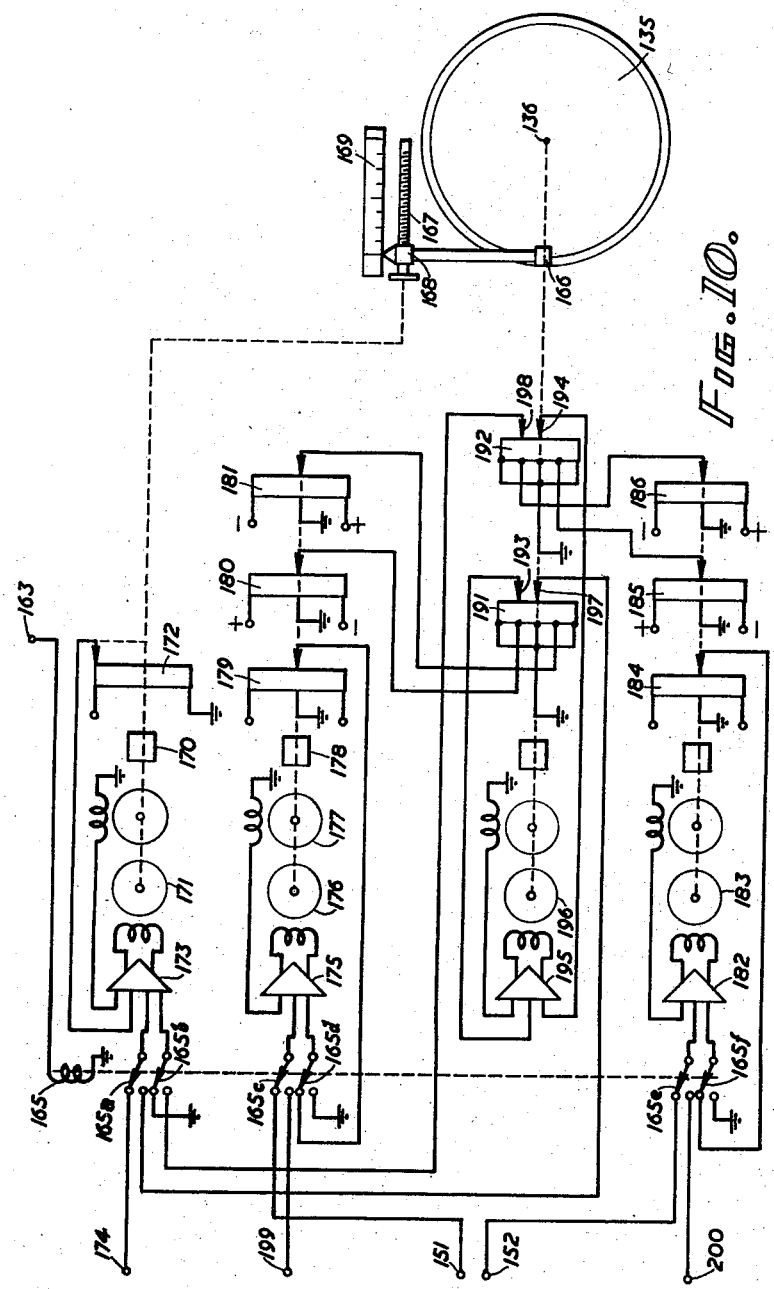

Figs. 9 and 10 show a further embodiment of the invention for use when the second chart is a circular chart.

Figure 11:
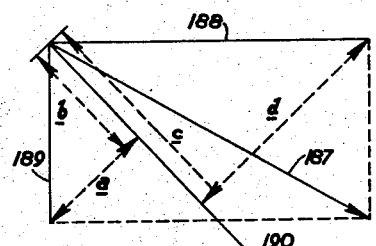
Figure 12:
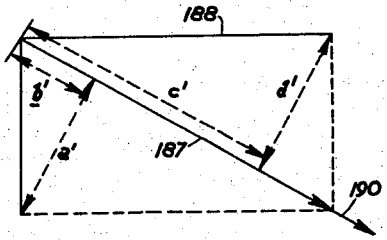
Figure 13:
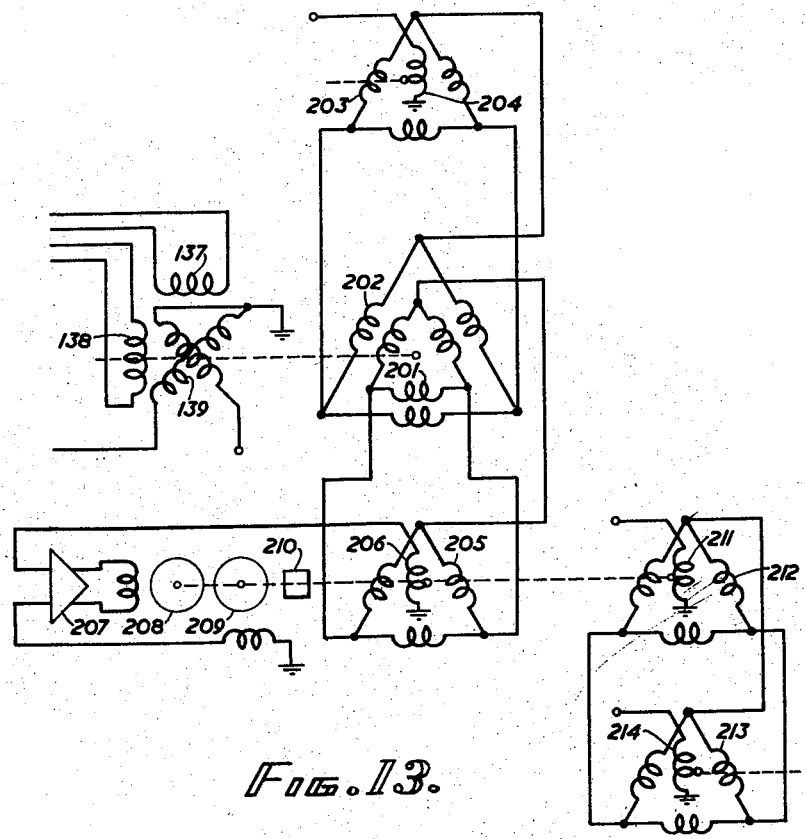

Figs. 11 and 12 are diagrams illustrating the operation of the apparatus shown in Figures 9 and 10, and Fig. 13 shows a modification of the apparatus of Figure 9 for providing a radio compass indication of the relative bearing of an aircraft from the point represented at the centre of the circular chart.

The first embodiment (Fig. 1) shows apparatus for recording the course of an aircraft on a first chart, and for automatically initiating course-recording on a second chart representing an area adjacent the area covered by the first chart, when the aircraft leaves the latter area and enters the former area. A first chart 14, representing an area in which the aircraft is initially located, is placed in a frame 15, and a second chart 16, representing an area east of the first area into which the aircraft is expected to fly, is placed in a frame 17. On the charts, the meridians are represented by vertical lines such as that indicated at 18 and the parallels by horizontal lines such as that indicated at 19.

As the course-recording mechanism for the two charts are identical only that which is associated with the first chart will be fully described.

The position of the aircraft is shown on the chart 14 by the position of a recording pen 20. This pen is mounted on a vertical lead-screw 21 in such a manner that when the lead-screw is rotated, the pen is displaced along it, the direction of displacement depending on the direction of rotation of the lead-screw. The angular velocity and direction of rotation of the lead-screw are determined by the amplitude and phase of an A. C. electric signal which is applied to terminal 22 and which represents the ground speed of the aircraft in the north-south direction. The alternating potential at terminal 22 is applied to an amplifier 23 which forms parts of a servo unit for rotating the lead-screw 21. The output of the amplifier serves to energise a winding 24 of a reversible two-phase motor 25. A winding 26 of a two-phase generator 27, which is driven by the motor 25, provides a velocity feed-back signal which prevents hunting and ensures that the angular velocity of the motor is proportional to the input voltage. It is to be understood that the energised reference windings of the motor 25 and of the generator 27, and of corresponding motors and generators in this and subsequent embodiments have been omitted from the drawings for the sake of clarity. The motor 25 is also mechanically coupled through a gear-box 28 to the vertical lead-screw 21. The movement of the pen 20 along the vertical lead-screw is therefore controlled in speed and direction by the amplitude and phase of the signal applied to terminal 22.

A bearing block 29 on the vertical lead-screw is mounted on a horizontal lead-screw 30 in such a manner that the whole of the vertical lead-screw assembly is displaced horizontally across the chart 14 when the horizontal lead-screw is rotated. The angular velocity and direction of rotation of the lead-screw 30 are determined by the amplitude and phase of an A. C. electric signal which is applied to terminal 31 and which represents the east-west velocity of the aircraft.

Figure 1:
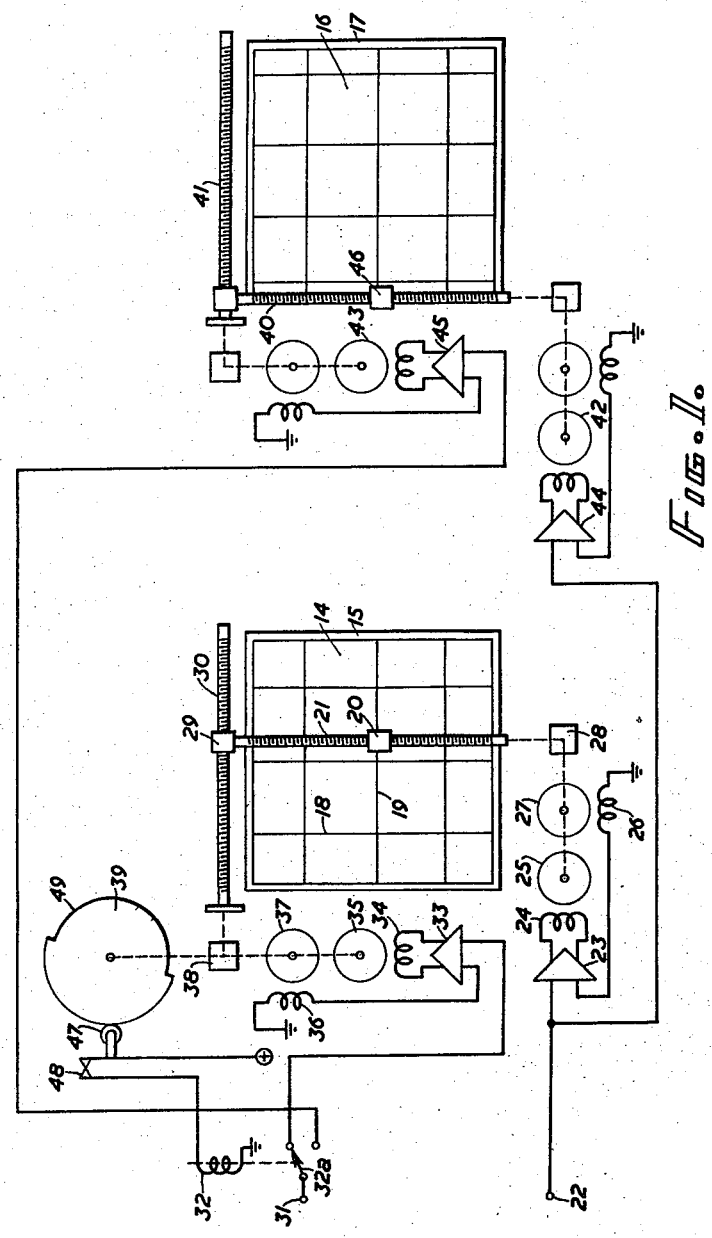
Fig. 1 shows course recording apparatus, according to the first embodiment of the invention, for use with charts representing adjacent areas.

Terminal 31 is connected to a contact spring 32a of a relay 32. When the latter is energised the contact spring 32a is in the upper position, as shown in Figure 1, and the signal at terminal 31 is applied to an amplifier 33 of a servo unit similar to that described in connection with the vertical lead-screw. The output of the amplifier 33 serves to energise a winding 34 of a two-phase motor 35, and the winding 36 of a two-phase generator 37, which is driven by the motor 35, provides a velocity feed-back signal. The motor 35 is also mechanically coupled, through a gear-box 38, to the horizontal lead-screw 30 and to a cam 39, the function of which will be described hereinafter. The movement of the block 29 is therefore controlled in speed and direction by the amplitude and phase of the signal applied to terminal 31.

Thus the pen 20 moves over the chart 14 in a manner determined jointly by the ground speed signals applied to the amplifiers 23 and 33.

In a similar manner, the vertical and horizontal lead-screws 40 and 41 associated with the second chart 16 are rotated by motors 42 and 43 in response to signals applied to the amplifiers 44 and 45. The servo units of which the motors 42 and 43 and the amplifiers 44 and 45 form parts, are similar in all respects to that which was described in connection with the vertical lead-screw 21 and which consisted of the amplifier 23, the motor 25, the generator 27 and the gear-box 28.

It will be seen that the amplifier 44, like amplifier 23, is at all times connected to the terminal 22, so that a pen 46, like the pen 20, is at all times moved along its vertical lead-screw in accordance with the north-south ground speed signals applied to the terminal 22.

The amplifier 45 is connected to the lower contact associated with the contact spring 32a and the east-west ground speed signal at terminal 31 is therefore applied either to amplifier 33 of the first course-recording mechanism or to amplifier 45 of the second course-recording mechanism, according to the position of the contact spring 32a.

With the cam 39 in the position shown, a cam follower 47 is maintained in a position such that contacts 48 are held closed, the relay 32 is energised and the contact spring 32a is in its upper position. For this condition the east-west ground speed signals are applied to amplifier 33, causing rotation of the lead-screw 30 and of the cam 39. When the pen 20 reaches the right-hand side of the first chart 14, the cam 39 will reach an angular position such that the follower 47 will enter the recess 49 in the cam. As a result, the contacts 48 will open, the relay 32 will be de-energised, and the contact spring 32a will assume its lower position. The east-west ground speed signal from terminal 31 is now removed from amplifier 33, and is applied instead to amplifier 45 of the second course-recording system.

The operation of the apparatus shown in Figure 1 may be summarized as follows. While the aircraft is flying in the area represented on the first chart, the pen 20 is displaced in accordance with both the north-south and the east-west components of ground speed, and records the course of the aircraft. At the same time, the pen 46 of the second course-recording system is displaced along the vertical lead-screw 40 in accordance with the north-south component of ground speed of the aircraft. The pens 20 and 46 are thus always over points on their respective charts having the same latitude, and when the pen 20 reaches the eastern boundary of the first chart 14, the pens 20 and 46 will be over points on the charts 14 and 16 representing the same position. When the aircraft crosses the common boundary of the areas represented on the two charts, the relay 32 will be de-energised and the pen 46 will commence course recording on chart 16 in response to both the north-south and the east-west components of ground speed. While the aircraft is within the area represented by chart 16, the pen 20 is displaced in accordance with the north-south component of the ground speed, that is, it is displaced along the vertical lead-screw 21, which is now stationary at the right-hand side of the chart.

It will be obvious that by modifying the apparatus so that the cam 39 is driven by a motor which is always energized in accordance with the east-west ground speed of the aircraft, it can be arranged that if the aircraft returns to the area represented by chart 14, the pen 20 will resume recording its ground path on chart 14.

Figure 2:
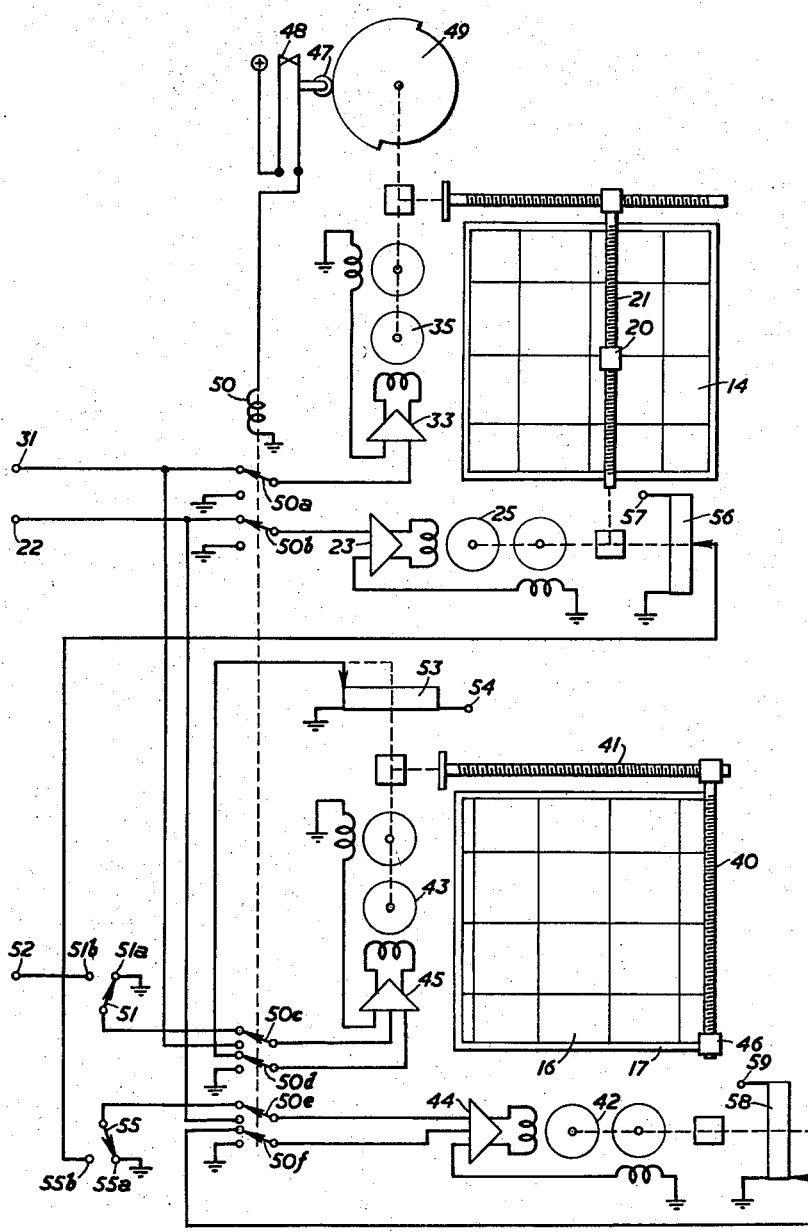
Fig. 2 shows a modified form of the apparatus of Figure 1.

Figure 2 shows a modified form of the apparatus of Figure 1, in which the second chart may represent either the area east of that represented on the first chart, or the area west of the latter and in which the appropriate chart can be set up in the second course-recording arrangement while the course of the aircraft is being recorded on the first chart. Those parts of the apparatus shown in Figure 2 which are the same as parts shown in Figure 1 have the same reference numerals in both figures.

With the apparatus of this embodiment, the pen 46 of the second course-recording system may be held stationary for any desired period while the aircraft is flying within the area represented by the first chart. During this period, the second chart 16 may be selected and set up in the frame 17. The motors 42 and 43 of the second course-recording arrangement may then be caused to operate, as hereinafter described, in such a manner that the pen 46 will move to the eastern or the western side of the second chart, as required, and will take up the latitude of the pen 20 on the first chart. Thereafter, the pen 46 will copy the north-south movements of the pen 20, but will remain at the side of the chart 16 until the aircraft crosses the common boundary between the first and second charts, whereupon switching means will operate automatically to initiate course-recording on the second chart. This apparatus differs from that of Figure 1 in the switching arrangements in the input circuits of the servo units for rotating the lead-screws and in that certain of the servo units are provided with drum-type potentiometers, each so arranged as to provide an output voltage dependent on the vertical or horizontal displacement of the corresponding pen from a reference position.

The cam-operated contacts 48 control the energisation of a relay 50 having six contact springs 50a–50f, and the circuits opened and closed by these contact springs will now be described.

The contact springs 50a and 50b are permanently connected to the input circuits of the amplifiers 33 and 23 respectively. In their upper positions, these contact springs connect the amplifiers 33 and 23 to terminals 31 and 22 respectively, to which signals representing the east-west and north-south components respectively of ground speed of the aircraft are applied. In their lower positions, they connect the amplifier inputs circuits to earth.

The contact springs 50c and 50d are permanently connected to the input circuit of the amplifier 45 of the servo responsible for rotating the lead-screw 41.

In its upper position, the contact spring 50c connects the amplifier 45 with a manually operable east-west switch arm 51, which co-operates with two fixed contacts 51a and 51b. Contact 51a is earthed and the switch arm is connected thereto when it is desired that the pen shall commence recording at the eastern edge of chart 16, i. e. when the latter represents an area to the west of that represented on the first chart 14. Contact 51b is connected to a supply terminal 52, and the switch arm is connected thereto when the second chart represents an area to the east of that represented on the first chart and the pen is required to commence recording at the western edge of the chart.

When the contact spring 50d is in its upper position, it connects the amplifier 45 to the wiper of a drum-type "answer" potentiometer 53. This wiper is mechanically coupled to the shaft of the motor 43, which is responsible for the rotation of the horizontal lead-screw 41 of the second course-recording system and is driven by the motor in accordance with the output of amplifier 45. The winding of this potentiometer is earthed at one end and has its other end connected to a supply terminal 54, whereby an alternating voltage equal to and in phase opposition with that applied at terminal 52 is applied across the said winding. The connections are such that when the contact springs 50c and 50d are in their upper positions, the motor 43 will rotate unless the potentials of the switch arm 51 and the wiper of potentiometer 53 are equal and opposite. If the switch arm 51 is set to the earthed contact 51a, with the pen in the position shown, the motor 43 will not rotate owing to the fact that the wiper is already at the earthed end of potentiometer 53. If the switch arm 51 is set to contact 51b, the motor 43 will rotate and will drive the wiper until it reaches the end of potentiometer 53 connected to the terminal 54. At the same time, the pen 46 will move to the western edge of chart 16, and will then remain on this side of the chart. Thus the servo for the horizontal lead-screw 41 now acts as a positioning servo, and positions the pen 46 in accordance with the position of switch arm 51.

In their lower positions, contact spring 50c connects amplifier 45 to the input terminal 31 and contact spring 50d is connected to earth. The amplifier 45 therefore receives the east-west ground speed signals, and since the "answer" potentiometer is now disconnected, the servo acts as an integrator and displaces the pen at a speed proportional to the east-west ground speed of the aircraft.

Contact springs 50e and 50f are connected to the input circuit of the amplifier 44 of the servo responsible for rotating the lead-screw 40.

In its upper position, contact spring 50e connects the amplifier 44 to a manually operable switch arm 55, which co-operates with two fixed contacts 55a and 55b. Contact 55a is earthed, and the switch arm is set to this contact before the second chart 16 is placed in the frame 17. Contact 55b is connected to the wiper of a drum-type potentiometer 56. This wiper is mechanically coupled to the shaft of the motor 25 of the servo unit responsible for rotating the vertical lead-screw 21 of the first course-recording system. One end of the winding of potentiometer 56 is earthed, and the other end is connected to a supply terminal 57 whereby an alternating potential is applied across the said winding. The output voltage of the wiper is proportional to the displacement of the pen 20 from the bottom of the first chart.

Contact spring 50f, in its upper position, connects amplifier 44 to the wiper of a drum-type "answer" potentiometer 58, this wiper being mechanically coupled to the shaft of the motor 42 (energised by the amplifier 44) of the servo unit responsible for rotating the vertical lead-screw 40 of the second course-recording system. One end of the winding of potentiometer 58 is earthed, while the other end is connected to a terminal 59, whereby there is applied across the said winding an alternating voltage equal to and in phase opposition to that at terminal 57. The connections are such that when the contact springs 50e and 50f are in their upper positions and switch arm 55 is set to contact 55b, the motor 42 will rotate if the antiphase voltages from the wipers of potentiometers 56 and 58 are unequal, and will drive the wiper of the "answer" potentiometer 58 in such a direction that the resultant of the antiphase voltages decreases. When switch arm 55 is set to contact 55b, the motor 42 will rotate so as to bring the pen 46 to a position on lead-screw 40 which corresponds to the position of the pen 20 on the lead-screw 21, and thereafter will maintain the "horizontal" alignment of these two pens.

In their lower positions, contact spring 50e connects amplifier 44 to the input terminal 22, and contact spring 50f is connected to earth. The amplifier 44 therefore receives only the signals applied to terminal 22, i. e. the north-south ground speed signal and since the wiper of the "answer" potentiometer 58 is now disconnected, the servo acts as an integrator and displaces the pen along the vertical lead-screw 40 at a speed proportional to the voltage available at terminal 22.

The apparatus operates in the following manner. The manual switch arm 55 is initially set to the contact 55a, so as to disconnect the wiper of the potentiometer 56 and maintain the pen 46 at the bottom of the lead-screw 40. Course-recording on the first chart now commences, the pen 46 remaining at the bottom of the lead-screw 40 and at the left or right-hand edge of the second chart area according to the setting of the switch arm 51. Assuming that it now becomes evident that the aircraft is likely to fly into the area to the east of the chart 14, switch arm 51 is set to contact 51a, and the pen 46 accordingly moves horizontally to the bottom left-hand corner of the chart frame 17. The selected chart 16 is now inserted in the frame 17, and the switch arm 55 is set to the contact 55b, thus completing the manual operations. The motor 42 immediately rotates so as to align the position of the pen 46 on the vertical lead-screw 40 with that of the pen 20 on the vertical lead-screw 21, and thereafter maintain this alignment with respect to latitude. Since the commencement of the course-recording, the cam 49 will have been rotated in accordance with any change of longitude of the aircraft by the servo unit including the motor 35, and when the pen 20 reaches the bottom of the chart 14, the cam follower 47 will enter the recess 49 and will allow the contacts 48 to open. The relay 50 will be de-energised, and the contact springs 50a–50f will assume their lower positions. As a result, the input signals at terminals 22 and 31 representing the ground speed of the aircraft are cut off from amplifiers 23 and 33 and applied instead to amplifiers 44 and 45, and course recording commences from the correct point on the second chart 16.

It will be apparent that by suitable modifications of the apparatus of Figure 2, the second course-recording system could be used for charts representing areas north or south of the area on the first chart, or for any of the charts having a common boundary with the first chart 14.

Figure 3:
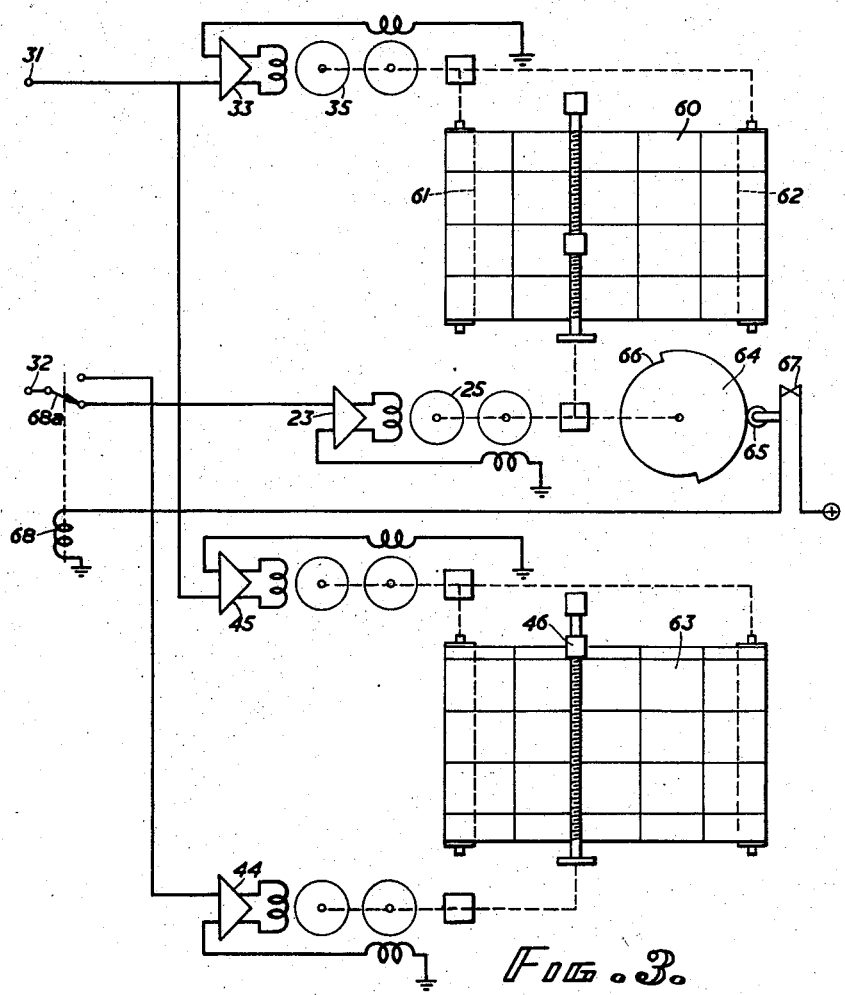
Fig. 3 shows a further modified form of the apparatus of Figure 1, for use with roller charts.

Figure 3 shows a modified form of the apparatus of Figure 1, in which the chart is displaced horizontally, relative to the recording pen, in response to the east-west ground speed signals. As before, the pen is displaced vertically relative to the chart in response to the north-south ground speed signals. Parts shown in Figure 3 which are the same as parts shown in Figure 1 are given the same reference numerals.

The chart 60 is much longer in the east-west direction than in the north-south direction, and is wound on two parallel rollers 61 and 62 which are mechanically coupled to the shaft of the motor 35. As before, the amplifier 33 receives by way of terminal 31 signals representative of the east-west ground speed of the aircraft, and the motor 35 is energised by the output of the amplifier 33. The rollers 61 and 62 are therefore rotated in accordance with the east-west ground speed of the aircraft, and the chart 60 is wound onto one of the rollers at the same speed as it is unwound from the other roller. The pen 20 co-operates with the section of the chart stretched between the rollers.

As in the case of the apparatus shown in Figure 1, the displacement of the pen 20 along the vertical lead-screw 21 is controlled in accordance with the value of the north-south ground speed signal applied to terminal 22.

In the apparatus of Figure 3, since the aircraft can travel a considerable distance in the east-west direction while remaining within the area of the first chart, the second chart 63 is chosen to represent the area adjacent and to the north or south of the area represented on the first chart. (In this case, it will be assumed that the selected chart represents the area to the south of that on the first chart.) For these reasons, the apparatus differs in the following respects from that of Figure 1.

Firstly, in order that, when the aircraft reaches the common boundary of the charts, the pen 46 may commence course-recording at the correct point on the chart 63, the second chart must copy the movement of the first chart while the course of the aircraft is being recorded on the first chart. The amplifiers 33 and 45 of the servo units responsible for the movement of the charts are therefore both connected to the terminal 31, to which the east-west ground speed signals are applied.

Secondly, as the signal at terminal 22 representing the north-south ground speed of the aircraft, must in this case be cut off from amplifier 23 of the first course-recording system when the pen reaches the bottom of the chart 60 and applied instead to the amplifier 44 of the second course-recording system, the cam 39 (Figure 1) coupled to the servo-motor for rotating the horizontal lead-screw 30 must be replaced by a similar cam 64 coupled to the motor 25 responsible for rotating the vertical lead-screw 21.

When the pen 20 reaches the bottom of the chart 60, a cam follower 65 enters a recess 66 in the cam and allows contacts 67 to open. A relay 68 is thereby de-energised, and contact spring 68a moves to disconnect terminal 22 from amplifier 23 and to connect it to amplifier 44. The pen 46 of the second course-recording system then commences to record the track of the aircraft on the second chart 63.

Figure 4 shows apparatus for automatically initiating course-recording on a large-scale rectangular chart 69 which represents an area within that represented on the smaller-scale chart 14, given the position of the aircraft on the latter chart and its ground speed and direction of flight. Both charts are shown as being based on a cylindrical projection, and therefore the meridians and parallels are straight lines and are mutually perpendicular.

The position of the area represented by the large-scale chart 69 is shown on the chart 14 by a dotted rectangle.

The vertical lead-screw 21 of the first course-recording system is mechanically coupled to the wiper 70 of a rotary switch 71 which includes two arcuate contacts 72 and 73 on an insulated base 74, these arcuate contacts being separated by a gap 75. The wiper 70 is connected to a terminal 76 to which there is applied a positive potential with respect to earth. Two diametrically opposite fixed brushes 77 and 78 of the switch 71 connect the arcuate contacts 72 and 73 through the windings of relays 79 and 80 respectively to earth.

The wiper 70 has a limited angular travel: starting from a position opposite brush 77, when the pen is at the top of the chart, it travels clockwise in response to rotation of the lead-screw 21, and reaches a position opposite brush 78 when the pen is at the bottom of the chart. The body of the rotary switch, comprising the contacts 72 and 73 and the insulated base 74, can be manually rotated so that the gap 75 between the contacts 72 and 73 can be given a position in the path of the wiper corresponding to the position of the dotted rectangle in the north-south dimension of the chart 14.

While the pen 20 is north of the upper edge of the dotted rectangle on chart 14, the wiper 70 is on contact 72 and relay 79 is energised. While the pen 20 is south of the lower edge of the dotted rectangle, wiper 70 is on contact 73 and relay 80 is energised. While the pen 20 is within the dotted rectangle or within the east and west extensions of this rectangle, wiper 70 is over the gap 75 between contacts 72 and 73, and neither relay is energised.

In the position shown in Figure 4, the pen 20 is north of the dotted rectangle and therefore relay 79 is energised and relay 80 is unenergised. The contact springs 79a and 79b of relay 79 are permanently connected to the amplifier 44, which is associated with the servo for the vertical lead-screw of the second course-recording system. With relay 79 energised, the contact springs 79a and 79b are in their upper positions, in which contact spring 79a connects amplifier 44 to the terminal 81, to which there is applied an alternating potential with respect to earth, and contact spring 79b connects amplifier 44 to the wiper of a drum-type "answer" potentiometer 82. This wiper is driven by the motor 42 in accordance with the output of amplifier 44. The potentiometer 82 has a centre-tapping which is connected to earth, and has its ends supplied with alternating potentials from terminals 83 and 84 equal in amplitude to that applied to terminal 81. The potential at terminal 84 is in phase with, and that at terminal 83 is in phase-opposition to, that applied to terminal 81. The arrangement is such that the motor 42, when energised by the output of amplifier 44, rotates and drives the wiper of potentiometer 82 in such a direction that the output of potentiometer 82 approaches a value equal and opposite the potential of terminal 81. Thus with the relays 79 and 80 in the condition shown, the motor 42 drives the wiper of potentiometer 82 until it reaches that end of the potentiometer which is connected to the terminal 83, and at the same time, drives the pen 46 to the top of the vertical lead-screw 40. The pen 46 is thus ready to commence recording at the top of chart 69 if the aircraft crosses the northern boundary of the area represented on the latter.

If the craft now enters the area represented by the dotted rectangle or its horizontal (east-west) extensions on chart 14, that is, the area of chart 14 defined by the parallels of latitude coinciding with the north and south boundaries of the dotted rectangle, wiper 70 of the rotary switch 71 leaves contact 72 and passes into the gap 75 between the contacts 72 and 73. Relay 79 is de-energised, and contact springs 79a and 79b assume their lower positions, in which they are connected to contact springs 80a and 80b. The latter are also in their lower positions, in which contact spring 80a is connected to terminal 22, to which signals representative of the north-south ground speed of the aircraft are applied and contact spring 80b is earthed. Amplifier 44 therefore receives only the north-south ground-speed signals. As the wiper of "answer" potentiometer 82 is now disconnected from amplifier 44, the servo unit comprising motor 42 acts as an integrating instead of a positioning device, and drives the pen 36 down the vertical lead-screw at a speed dependent on the north-south ground speed of the aircraft.

If the pen 20 in following the movement of the craft on the first chart 14 now takes up a position south of the rectangle 69 and its horizontal extensions, wiper 70 of the rotary switch 71 will pass to contact 73. Relay 80 will then be energised, and relay 79 will remain unenergised; the reverse of the condition shown in Figure 4. Contact springs 79a and 79b will remain in their lower positions, connected to contact springs 80a and 80b respectively. The latter however will be in their upper positions, in which contact spring 80b is connected to the wiper of the "answer" potentiometer 82, while contact spring 80a is connected to a terminal 85 to which there is applied an alternating potential with respect to earth equal to and in phase opposition to that at terminals 81 and 84. The motor 42 therefore rotates until the alternating signal which the amplifier 44 receives from the wiper of potentiometer 82 is equal and opposite to that which it receives by way of terminal 85, that is, until the wiper of the potentiometer 82 is at that end of the potentiometer which is connected to terminal 84. The pen 46 will then be at the bottom of the vertical lead-screw, and thus ready to commence recording on chart 69 if the aircraft enters the area represented on that chart by way of its southern boundary.

The horizontal lead-screw 30 of the first course-recording system is mechanically coupled to the wiper 86 of a rotary switch 87 which is similar to the rotary switch 71, and which is associated with a relay system similar to that described in connection with the north-south relays 79 and 80. The body of the rotary switch 87 can be rotated so that the gap 88 between the arcuate contacts 89 and 90 is given a position in the path of the wiper 86 corresponding to the position of the dotted rectangle in the east-west dimension of the chart 14.

When the pen 20 is east of the right-hand side of the dotted rectangle as shown in Figure 4, the wiper 86 rests on contact 90, whereby relay 92 is energised and relay 91 is unenergised. The amplifier 45 of the "horizontal" servo unit of the second course-recording system has applied thereto an alternating signal by way of terminal 85 and an "answer" potential from the wiper of a drum-type potentiometer 93 similar to the potentiometer 82. The motor 43, which is energised by the output of amplifier 45, drives the horizontal lead-screw 41 and the wiper of the potentiometer 93 until the latter provides an alternating signal equal and in phase opposition to that at terminal 85. At this point, the vertical lead-screw 40 is positioned at the right-hand end of the horizontal lead-screw 41.

When the pen 20 is within the dotted rectangle on chart 14 or its vertical (north-south) extensions, that is, within the area defined by the meridians coinciding with the east and west boundaries of the dotted rectangle on chart 14, the wiper 86 is in the gap 88 between contacts 89 and 90, and both relays 91 and 92 are de-energised. The amplifier 45 then receives by way of terminal 31 signals representative of the east-west ground speed of the aircraft, and the motor 43, acting as an integrating device, moves the vertical lead-screw 40 along the horizontal lead-screw 41 at a rate determined by the said east-west ground speed.

When the pen 20 is west of the dotted rectangle on chart 14, the wiper 86 is on contact 89, whereby relay 91 is energised, and relay 92 is unenergised. The amplifier 45 then receives input signals from terminal 81 and from the wiper of the "answer" potentiometer 93, and the motor 43 drives the horizontal lead-screw 41 and the wiper of potentiometer 93 until the latter provides an alternating output signal equal and opposite to that at terminal 81. The vertical lead-screw 40 will now be located at the left-hand end of the horizontal lead-screw 41.

Thus during a course-recording operation, while the pen 20 is neither within the dotted rectangle on chart 14 nor within the north-south or east-west extensions of the dotted rectangle, the pen 46 remains stationary in the appropriate corner of the chart 69; it travels along the appropriate edge of the chart 69 when the pen 20 passes through one of the extensions of the dotted rectangle, e. g. along the northern edge of the chart 69 when the pen 20 traverses the northern extension of the dotted rectangle; and it enters the chart 69 and commences course-recording thereon when the pen 20 enters the dotted rectangle.

Figure 5 shows alternative apparatus for automatically initiating course-recording on a rectangular large-scale chart 69a, in which the two course-recording systems operate in series when the aircraft is within the area represented by the large-scale chart, as distinct from the parallel arrangement of Figure 4.

The first course-recording system is the same as that shown in Figure 4, and the dotted rectangle shows the position on the first chart 14 of the large-scale second chart 69a. The pen 20 on the vertical lead-screw 21 of the first course-recording system is mechanically connected to the wiper of a potentiometer 94, one end of which is earthed and the other end of which has applied thereto an alternating potential of 100 volts peak amplitude with respect to earth. The arrangement is such that the wiper has a maximum voltage when the pen 20 is at the top of the lead-screw 21 and zero voltage when the pen is at the bottom of the lead-screw 21, so that the voltage across the potentiometer 94 may be considered to represent the vertical length of the chart 14.

A further potentiometer 95 has one end of its winding earthed, and the other end connected to a source of alternating potential of 100 volts peak amplitude with respect to earth, the alternating potential applied across potentiometer 95 being in phase opposition with that applied across potentiometer 94. As in the case of potentiometer 94, the potential of 100 volts across potentiometer 95 is considered to represent the vertical length of the chart 14. The wiper of potentiometer 95 is manually preset so that the wiper receives a voltage representative of the length of vector V on chart 14, that is, the length on chart 14 of the north-south distance from the bottom of chart 14 to the bottom of the dotted rectangle.

In the following description of this embodiment, voltages in phase with the alternating potential applied to potentiometer 94 will be referred to as A-phased voltages, and those in phase with the alternating potential applied to potentiometer 95 will be referred to as B-phased voltages. A-phased and B-phased voltages will thus always be in phase-opposition.

The wipers of potentiometers 94 and 95 are connected to the summing amplifier 44 associated with the vertical lead-screw of the second course-recording system. It will be seen that when the position of the craft is such that the pen 20 is north of the upper edge of the dotted rectangle, the output of the potentiometer 94 will exceed that of the potentiometer 95 and there will be a resultant A-phased voltage at amplifier 44. This resultant voltage will have an amplitude of, for example, 15 volts when the pen 20 is on the parallel containing the upper edge of the dotted rectangle, and will decrease to zero as the pen 20 approaches the parallel containing the lower edge of the dotted rectangle. When the pen 20 is south of the latter parallel, the output of potentiometer 95 will exceed that of potentiometer 94 and there will be a resultant B-phased voltage at the amplifier 44.

The input circuit of the amplifier 44 is also connected to the wiper of an "answer" potentiometer 96, this wiper being mechanically connected to the pen 46 on the vertical lead-screw 40. The lower end of this potentiometer 96 is earthed, and for this example the upper end is connected to a source of B-phased alternating potential of 15 volts peak amplitude with respect to earth, the arrangement being such that the wiper voltage is a maximum when the pen 46 is at the top of the chart 69 and zero when the pen is at the bottom of the chart. The motor 42, which is energised by the output of amplifier 44, is connected through a clutch 97 to the vertical lead-screw and tends to drive the wiper of potentiometer 96 to a position in which it is supplying an output voltage equal and opposite to the resultant of the output voltages of potentiometers 94 and 95.

When the pen 20 is north of the upper edge of the dotted rectangle the amplifier 44 receives from potentiometers 94 and 95 a resultant A-phased voltage which exceeds 15 volts in amplitude, and the motor 42 accordingly drives the wiper of potentiometer 96 to that end of the potentiometer which receives the B-phased 15 volt supply, the pen 46 of the second course-recording system being then at the top of the vertical lead-screw 40. The motor 42 then continues to rotate, but merely causes slipping of the clutch 97.

When the pen 20 is within the dotted rectangle or within the horizontal (east-west) extensions of this rectangle on chart 14, the resultant of the output voltages of potentiometers 94 and 95 will be an A-phased voltage of less than 15 volts amplitude. The motor 42 will accordingly drive the wiper of potentiometer 96 back to a point at which it provides an equal B-phased voltage, the pen being correspondingly positioned on the vertical lead-screw 40.

If the pen 20 in following the movement of the craft moves south of the parallel containing the lower edge of the dotted rectangle, the resultant of the output voltages of potentiometers 94 and 95 is a B-phased voltage. The motor 42 then drives the wiper of potentiometer 96 to the earthed end of the latter, the pen 46 travelling to the lower end of the lead-screw 40. The motor then continues to rotate, but merely causes slipping of the clutch.

Potentiometer 98, the wiper of which is mechanically connected to the bearing block 29 on the horizontal lead-screw 30, and potentiometer 99, which is preset to provide an output representative of the horizontal distance H on chart 14, form a horizontal potentiometer system corresponding to the vertical system formed by potentiometers 94 and 95. The wipers of potentiometers 98 and 99 are connected to the input of the summing amplifier 45, which also receives an "answer" voltage from the wiper of a potentiometer 100. The potentiometer 100 corresponds to the "answer" potentiometer 96 associated with the vertical lead-screw, the setting of its wiper being controlled by the horizontal lead-screw 41. The latter is driven, through clutch 101, by the motor 43, in accordance with the output of amplifier 45. The co-operation of the potentiometers 98, 99, 100, amplifier 45 and motor 43 and the clutch 101 corresponds exactly to that described in connection with the potentiometers 94, 95 and 96, amplifier 44 and motor 42. The results may be summarised as follows: When the pen 20 is east of the dotted rectangle on chart 14, pen 46 and the vertical lead-screw 40 in the second course-recording system are maintained at the right-hand end of horizontal lead-screw 41. If the pen 20 passes through the dotted rectangle or its vertical (north-south) extensions, the motor 43 will drive the lead-screw 41 so that the vertical lead-screw 40 and the pen 46 will move across the chart 69a, following the movement of the pen 20 across the dotted rectangle on chart 14. If the pen now moves to a point west of the dotted rectangle on chart 14, the pen 46 and the vertical lead-screw 40 will move to the left-hand end of the horizontal lead-screw 41.

Thus while the pen 20 is at a point which is neither within the dotted rectangle nor within its horizontal and vertical extensions on the chart 14, the pen 46 will remain stationary in the appropriate corner of the chart 69a. If the pen 20 passes through one of the extensions of the dotted rectangle, the pen 46 will move along the corresponding side of the chart 69a, so as to be in correct position to commence recording if the pen 20 should enter the dotted rectangle. Finally when the craft enters the area represented by the dotted rectangle, the pen 46 moves into the chart 69a and commences recording thereon.

Figures 6, 7 and 8 illustrate a modification of the apparatus of Figure 5 for use when the area represented on the large-scale second chart, when projected on the first chart, is off-set with respect to the sides of the first chart, for example, when the charts are based on a straight-meridian conic projection.

Figure 6 shows part of the frame 15 and a conic chart 102 of the first course-recording system. The dotted rectangle 103 represents the position on the chart 102 of the area represented by a large scale second chart.

As before, the manual potentiometers 95 and 99 (Figure 5) are adjusted to provide output voltages representative of the co-ordinates V and H of a point, in this case the point 104, which represents a corresponding point on the large-scale chart. The resultant voltages from the vertical potentiometers 94 and 95 and the horizontal potentiometers 98 and 99 are therefore representative of the Cartesian co-ordinates of the pen 20 with respect to axes parallel to the sides of the chart frame 15 and having their origin at the point 104. In Figure 6, a point 105 represents the position of the pen 20 and the vectors V' and H' represent the said Cartesian co-ordinates. As, however, the sides of chart frame 15 are not parallel to the sides of the dotted rectangle 103 which represents the large-scale chart, it is desirable to replace the axes parallel to the sides of frame 15 by axes parallel to the boundaries of the rectangle 103, while maintaining the point 104 as origin. For convenience, it is assumed that the lateral boundaries of the dotted area 103 are parallel to a meridian 106 passing centrally through the area. It is then necessary to find the co-ordinates of the point 105 with respect to axes represented by the line 107, parallel to the meridian 106, and a line 108 perpendicular thereto, both passing through the point 104. The value of the ordinate along the line 107 is obviously equal to $(H' \sin \theta - V' \cos \theta)$, where $\theta$ is the angle made by the line 107 with the vertical vector V', while that along line 108 is equal to $(H' \cos \theta + V' \sin \theta)$.

Referring now to Figure 7, conductors 109, 110 are connected to the wipers of the potentiometers 94 and 95 (Figure 5) of the vertical potentiometer system, and apply the output voltage of these potentiometers to a summing amplifier 111. The output of amplifier 111 is in the form of equal and antiphase voltages with respect to earth, applied to conductors 112 and 113. Conductors 114 and 115 are connected to the wipers of the potentiometers 98 and 99 (Figure 5) of the horizontal potentiometer system, and apply the output voltages of these potentiometers to a summing amplifier 116. The output of amplifier 116 is in the form of equal and antiphase voltages with respect to earth, applied to conductors 117 and 118.

The voltages pertaining to the pair of conductors 112, 113 and the pair of conductors 117, 118 respectively, represent the Cartesian co-ordinates of the point 105 with respect to axes parallel to the sides of frame 15 having their origin at point 104, and constitute the input signals for two contoured drum-type potentiometers 119 and 120 respectively. These potentiometers are so shaped and have their wipers so arranged that they provide output voltages proportional to the sine and cosine respectively of the angle of rotation of the wipers from a reference position.

The contour of the winding of the potentiometer 119 is diagrammatically illustrated in Figure 8, which shows the potentiometer opened out so as to lie in one plane (the ends 121 being normally joined together). This winding is such that when it is earthed at the point 121 and at the diametrically opposite point 122, and is provided with A. C. input voltages of equal amplitude but opposite phase at the two intermediate diametrically opposite points 123 and 124 (the polarity indications in the figure refer to the instantaneous conditions), the wipers 125 and 126, which are maintained at a constant angular spacing of 90°, provide output voltages proportional to the sine and cosine respectively of the angle of rotation of the wipers from a reference position. The voltage outputs of the wipers 125 and 126 are, of course, also proportional to the amplitude of the antiphase input signals applied to points 123 and 124 of the winding, from the summing amplifier 111 (Figure 7).

The inter-coupled wipers 125 and 126 are mechanically connected to a manually adjustable knob 127 (Figure 7), which can be preset to the angle $\theta$, the angle between the meridian 106 and the vertical side of the chart frame 15. The wipers 125 and 126 therefore provide output voltages which are proportional to the sine and cosine respectively of the angle $\theta$, and also proportional to the vector V' (Fig. 6).

Potentiometer 120 is similar to potentiometer 119. It receives from summing amplifier 116 equal and antiphase input voltages which are representative of the vector H' (Figure 6). The inter-coupled wipers 128 and 129, which are also mechanically coupled to the manually adjustable knob 127, provide output voltages which are proportional to the sine and cosine respectively of the angle $\theta$, and are also proportional to the vector H'. The wipers of potentiometer 120 lag 90° with respect to the wipers of potentiometer 119. This lag corresponds to the 90° angular spacing between the vertical and horizontal reference axes, and is necessary in order to take into account the sign, whether positive or negative, of the sine and cosine components.

Wipers 125 and 129 of the potentiometers 119 and 120 are connected via conductors 130, 131 to the summing amplifier 45 (Fig. 5) which therefore receives a resultant voltage which is always proportional to ($H'$ cos $\theta + V'$ sin $\theta$). Wipers 126 and 128 are connected over conductors 132 and 133 to the summing amplifier 44 (Fig. 5), which therefore receives a resultant signal which is always proportional to ($H'$ sin $\theta - V'$ cos $\theta$). The output voltages of the amplifiers 44 and 45, which are responsible for the rotation of the lead-screws 40 and 41 of the second course-recording system, therefore represent the Cartesian co-ordinates of the point 105 (Fig. 6) with respect to axes parallel to the sides of the dotted rectangle 103, having their origin at point 104.

The second course-recording system therefore operates exactly as in the case of the apparatus of Figure 5.

Figures 9 and 10 show apparatus for recording the course of an aircraft on a chart based on a straight-meridian conic projection and for automatically initiating course-recording on a large-scale circular chart, on which is represented an area within that covered by the conic chart, when the aircraft enters the said area.

In Figure 9, the frame 15 contains a chart 134 on which a dotted circle shows the area represented by the large-scale chart 135 (see Figure 10). The means for recording the course of the aircraft on the chart 134 are the same as those shown in Figure 5.

However, since on a chart based on a conic projection there can be only one meridian which coincides with the vertical direction of the chart and only one point on each parallel at which the tangent to the parallel coincides with the horizontal direction of the chart, a correction depending on the position of the pen on the chart must be introduced if the movement of the aircraft is to be recorded by means of mutually perpendicular lead-screws and on the basis of data relating to the north-south and east-west ground speeds of the aircraft. Our co-pending applications 21,552/51 and 26,946/52, respectively British Patent 711,294, June 30, 1954, and British Patent 711,894, July 14, 1954, describe apparatus for determining the magnitude of these corrections and for applying them in such a manner that the recording pen plots on a conic chart a course which is in substantial agreement with the course steered by the pilot.

The potentiometers 94, 95, 98 and 99, and the summing amplifiers 111 and 116 for determining the co-ordinates of the pen 20 with respect to axes parallel to the sides of the chart frame and having their origin at a point represented on the large-scale chart, are the same as those shown in Figures 5 and 7, the said point on the large-scale chart 135 being the centre 136 (Figure 10). It will now be shown how the output signals from amplifiers 111 and 116, representing the said co-ordinates, are used to rotate the circular chart in such a manner that a pen at the circumference of the circular chart will be over the correct point on the chart when the aircraft reaches the boundary of the area represented thereon, and to initiate course-recording when the aircraft crosses the boundary.

In Figure 9, the signals from the amplifiers 111 and 116 are used to energise the field windings 137 and 138 respectively of the stator of a sine-cosine resolver which forms part of a bearing servo system. The rotor of the resolver includes a winding 139 which has a voltage induced therein when it is not at right-angles to the resultant field of the stator. The winding 139 is connected to the amplifier 140, the output of which energises a motor 141. The motor drives a generator 142, which provides a velocity feed-back signal, and the motor 141 is coupled through a gear-box 143 to the rotor of the resolver, the connections being such that the motor 141 rotates until the winding 139 is in its zero-signal position, that is, at right-angles to the resultant field of the resolver stator.

In order to correct for the known deviation $\theta$ between the meridian of the conic projection passing through the centre of the dotted circle and a "vertical" line passing through this point, the stator of the resolver, comprising the field coils 137 and 138, is given an angular displacement, with respect to the body of the bearing servo, equal to the deviation angle $\theta$. This adjustment, like the adjustments of the wipers of potentiometers 95 and 99, is made when it is decided which portion of the area represented on chart 134 is to be represented in the larger-scale recording unit.

As a result of this adjustment, the resolver rotor, which would otherwise take up a position determined by the angle between a vertical line through the point at the centre of the dotted circle and the line joining the pen 20 to the said point, instead assumes an angular setting representing the true bearing of the pin 20 from the said point.

The bearing servo also includes a sine-cosine drum-type potentiometer 144 of the kind shown diagrammatically in Figure 8. The input terminals 145 and 146 of this potentiometer are connected to supply terminals 147 and 148, to which there are applied equal and antiphase alternating potentials with respect to earth. The wipers 149 and 150 are coupled to the motor shaft and are positioned thereby in accordance with the true bearing of the aircraft from the point represented at the centre of the circular chart. Terminals 151 and 152, which are connected to the wipers 149 and 150, therefore receive signals representative of the sine and cosine of the bearing, i. e. the east-west and north-south components of the bearing.

A further winding 153 on the resolver rotor, at right-angles to the winding 139, is in line with the resultant field of the stator when the winding 139 is in its zero-signal position, and provides an output voltage representing the distance of the pen 20 from the centre of the dotted circle. The winding 153 is connected to the amplifier 154 of a distance-measuring servo, and the output of this amplifier energises a motor 155. This distance-measuring servo also includes a generator 156, providing a velocity feed-back signal, a gear-box 157, a drum-type "answer" potentiometer 158, the wiper of which is driven by the motor through the gear-box, and a cam 159. The potentiometer 158 is earthed at its lower end, the upper end being given an alternating potential with respect to earth equal to the maximum voltage which the amplifier 154 can receive from the winding 153 of the resolver rotor, and in phase opposition with the said voltage. The wiper of potentiometer 158 is connected back to the amplifier 154, and in response to a signal from winding 153, the motor 155 will rotate and drive the wiper of potentiometer 158 until the "answer" signal from that wiper is equal and opposite to that from the winding 153. The distance-measuring servo will therefore take up an angular position which depends directly on the input voltage to the servo, that is, on the distance of the aircraft from the point represented at the centre of the large-scale chart.

The cam 159 includes a recess 160, the length of which represents the radius of the area represented on the large-scale circular chart 135. While the aircraft is outside this area, a cam follower 161 rides on the portion of the cam outside the recess, and a pair of contacts 162 are held closed, connecting a terminal 163 to a supply terminal 164. When the aircraft enters the area represented on the large-scale chart, the position of the cam 159 is such that the follower 161 springs into the recess 160, whereupon the contacts 162 are opened and terminal 163 is disconnected from supply terminal 164.

Referring now to Figure 10, it will be seen that terminal 163 is connected to the winding of the relay 165. This relay is in energised condition, when the aircraft is outside the area of the circular chart, and is de-energised when the aircraft enters the said area. The circuit arrangements will first be described with the relay 165 in energised condition, as shown in Figure 10. The effect of the denergisation of the relay will be explained hereinafter.

The circular chart 135 is mounted on a rotatable support 135a, and a pen 166 of the circular chart assembly is mounted on a lead-screw 167 by means of a bearing block 168, in such a manner that rotation of the lead-screw causes the pen to move transversely over the circular chart from its circumference to its centre. A fixed scale 169 is provided to indicate the distance of the aircraft from the chart centre. The lead-screw 167 is driven through gearing 170 from a motor 171 in a pen servo unit, the motor 171 also driving the wiper of an "answer" potentiometer 172. With contact springs 165a and 165b in their upper positions, as shown in Figure 10, the amplifier 173 of the pen servo is connected to a terminal 174 to which there is applied an alternating biasing potential. One end of the "answer" potentiometer 172 is earthed and the other end is given a potential with respect to earth which is equal and opposite in phase to that applied to terminal 174. The wiper of the potentiometer 172 is connected to the amplifier 173, and the motor 171 therefore drives the wiper to that end of the potentiometer 172 at which the wiper receives a signal equal and opposite to that of terminal 174. For this condition, the pen 166 is at the edge of the circular chart, and it remains there until the bias is removed from the amplifier 173.

From terminal 151 (see also Figure 9), a signal proportional to the sine of the true bearing angle is applied through contact spring 165c and an amplifier 175 to a motor 176 of an east-west locator/integrator servo. The motor 176 drives a generator 177 which provides a velocity feed-back, and is coupled through a gear-box 178 to the wiper of an "answer" potentiometer 179, which is centre-tapped to earth and has equal and antiphase alternating voltages applied to its ends. The motor continues to rotate until a voltage equal and opposite to the input voltage is fed back from the wiper of potentiometer 179 to the amplifier 175 over contact spring 165d. The extent of rotation of the motor 176 will therefore be proportional to the sine of the true bearing, that is, to the east-west component of bearing. The east-west servo includes two further drum-type potentiometers 180 and 181, the wipers of which are driven by the motor 176. Each of the potentiometers 180 and 181 is centre-tapped to earth and has applied to its ends equal and antiphase alternating voltages with respect to earth, the instantaneous polarities of the respective ends of these two potentiometers being as shown in the drawing. The amplitude of these voltages is equal to that of the biasing voltage applied to terminal 174. The reason for this will be made clear later. The wiper of potentiometer 180 provides an output voltage depending on its angular rotation, that is, proportional to the sine of the angle of bearing (the east-west component of bearing). The wiper of potentiometer 181 provides an output voltage equal to and in phase opposition with that of the wiper of potentiometer 180.

Similarly, from terminal 152 (see also Figure 9), a signal porportional to the cosine of the true bearing angle is applied through contact spring 165e and an amplifier 182 to a motor 183 of a north-south locator/integrator servo, the motor 183 driving the wiper of an "answer" potentiometer 184 until an equal and opposite signal is fed back from the wiper of the "answer" potentiometer to the amplifier 182 through the contact spring 165f. The extent of rotation of the motor 183 will be proportional to the cosine of the true bearing, that is to the north-south component of bearing. The north-south servo also includes two drum-type potentiometers 185, 186 having supply connections similar to those of the potentiometers 180 and 181 in the east-west servo. The wiper of potentiometer 185 provides an output voltage proportional to its angular rotation from a reference position, that is, to the cosine of the angle of bearing, or the north-south component of bearing, and the wiper of potentiometer 186 provides an equal and anti-phase output voltage.

The manner in which these voltages are used to cause the circular chart to rotate so as to follow the movement of the pen 20 on the conic chart will now be described with reference to Figures 11 and 12.

In Figure 11, the direction of the vector represents the bearing of the aircraft from the point represented at the centre of the circular chart, and while the aircraft is outside the area represented by the circular chart, the length of vector 187 represents the amplitude of the input voltages applied across the half-windings of potentiometers 180, 181, 185 and 186. The vectors 188 and 189 respectively represent the east-west and north-south components of the bearing vector 187, and correspond to the output voltages from the wipers of potentiometers 180, 185 for corresponding settings of the bearing servo. The vectors 188 and 189 are each resolved into sine and cosine components determined in accordance with the angular setting of the circular chart. Assuming the setting of the chart to be initially represented by the arrow 190, the vector 189 is resolved into the sine and cosine components $a$ and $b$ and the vector 188 into the sine and cosine components $c$ and $d$. Voltages corresponding to components $a$ and $d$ provide the input voltages for a servo which determines the angular rotation of the circular chart, and since the vectors $a$ and $d$ are in opposite senses, the chart is rotated until the voltages represented by these vectors are equal, and cancel each other, as shown by the vectors $a'$ and $d'$ in Figure 12, in which the arrow 190 coincides with the arrow 187. The angular setting of the circular chart is now such that a line drawn on the circular chart to indicate the bearing of the aircraft would lie along the line of movement of the pen 166.

No use is made of the voltages representing the vectors $c'$ and $b'$ (Fig. 12) until the aircraft comes within the area covered by the circular chart.

Referring again to Figure 10, the wipers of the potentiometers 180, 181 of the east-west servo are connected to diametrically opposite input terminals of a sine-cosine drum-type potentiometer 191 (similar to that shown diagrammatically in Figure 8) in a circular chart servo, providing this potentiometer with equal and antiphase input potentials with respect to earth, corresponding in amplitude to the length of vector 188 (Fig. 11). Similarly, the wipers of potentiometers 185, 186 of the north-south servo are connected to the diametrically opposite input terminals of a second sine-cosine drum-type potentiometer 192 in the circular chart servo, providing the potentiometer 192 with equal and antiphase input potentials with respect to earth, corresponding in amplitude to the length of vector 189 (Fig. 11).

Wipers 193, 194 of the potentiometers 191 and 192 provide output voltages corresponding to vectors $a$ and $d$ (Fig. 11), and are connected to the input circuit of an amplifier 195 in the circular chart servo. These two voltages are in phase opposition, and a motor 196, energized by the amplifier 195, rotates and drives the circular chart and the wipers of potentiometers 191 and 192 until these two voltages cancel each other.

Wipers 197 and 198 of the potentiometers 191 and 192, which provide output voltages corresponding to vectors $b$ and $c$ (Fig. 11) are connected to the lower contacts associated with the contact springs 165a and 165b. These contacts are not used until the relay 165 is de-energised.

From the foregoing description it is apparent that the apparatus continuously determines the bearing of the aircraft from the point represented at the centre of the circular chart, and its distance from this point, and furthermore, that while the aircraft is outside the area represented by the circular chart, the recording pen 166 of the latter is held at the edge of the chart 135 and the chart is made to rotate so that any moment a line on the circular chart representing the bearing of the aircraft from the centre of the chart, is in line with the pen 166.

The manner in which the apparatus operates when the aircraft comes within the area of the circular chart will now be described.

As soon as the aircraft enters the area represented on the circular chart 135, corresponding to the entry of the pen 20 into the dotted circle on the chart 134 (Fig. 9), the roller 161 enters the recess 160 on the cam 159 and the energisation circuit of the relay 165 is broken at contacts 162. Contact springs 165a–165f immediately assume their lower positions.

Potentiometers 180 and 185 in the east-west and north-south servos are at this moment providing output voltages which are equal to the product of the fixed input voltage (which must be equal to the bias voltage applied to terminal 174, for example 75 volts) and the sine and cosine respectively of the bearing. The fixed input voltage is represented in Figure 11 by the length of the vector 187, and, since the direction of vector 187 represents the bearing of the aircraft from the point represented at the centre of the circular chart, the output voltages of potentiometers 180 and 185 are represented in Figure 11 by the east-west and north-south vectors 188 and 189 respectively. If this fixed input voltage is considered to represent the radius of the circular chart, the output voltages of the potentiometers 180 and 185 represent to the same scale the east-west and north-south coordinates of the point at which the aircraft enters the chart area, with respect to the centre of the chart. Potentiometers 181 and 186 provide output voltages equal and opposite to those of potentiometers 180 and 185.

With the relay 165 de-energised, the east-west locator/integrator servo is now connected by way of contact spring 165c to a terminal 199 to which there is applied an input voltage representing the east-west ground speed of the aircraft, and contact spring 165d is connected to earth. As the "answer" potentiometer 179 is disconnected from the amplifier input circuit, the motor 176 starts to perform a time integration of the input voltage, and the subsequent total angular displacement of the motor at any moment, measured from the moment of operation of the change-over relay 165, is proportional to the distance travelled by the aircraft in the east-west direction since reaching the boundary of the circular chart area. As stated above, when the aircraft enters the said area, the potentiometers 180 and 181 provide output voltages representative of the east-west ordinate of the point at which the aircraft enters the said area with respect to the centre thereof. Thereafter, the wipers of these potentiometers are rotated by the motor 176 so that their output voltages continue to be representative of the east-west distance of the aircraft from the chart centre.

Similarly, with the relay 165 de-energised, the north-south locator/integrator servo is connected by way of contact spring 165e to a terminal 200 to which there is applied a voltage representative of the north-south ground speed of the aircraft, and the contact spring 165f is earthed. The total angular displacement of the motor 183 at any moment, measured from the moment of operation of the change-over relay 165, is proportional to the distance travelled by the aircraft in a north-south direction since it crossed the boundary of the circular chart area. The wipers of potentiometers 185 and 186 are now driven by the motor 183 so that their output voltages are proportional at any moment to the north-south distance of the aircraft from the point represented at the chart centre.

With the relay 165 de-energised, the voltages transmitted from the potentiometers 180 and 185 of the east-west and north-south servos to the sine-cosine potentiometers 191 and 192 in the circular chart servo are thus proportional at any moment to the east-west and north-south components of the distance of the aircraft from the centre of the circular chart. Potentiometers 181 and 186 provide output voltages equal and opposite to those of potentiometers 180 and 185, these being necessary for the operation of the sine-cosine potentiometers 191 and 192. It will be seen that the vector diagrams of Figures 11 and 12 are still applicable as an illustration of the manner of operation of the chart-rotating servo, though if the length of vector 187 in Figure 11 is considered as representing the radius of the chart, the scale of the diagram will decrease as the aircraft approaches the chart centre. The output voltages from the wipers 193 and 194 of the sine-cosine potentiometers 191 and 192, which are fed back to the amplifier 195, are still represented by vectors such as $a'$ and $d'$, and the motor 196 continues to rotate when necessary in order to maintain the bearing of the aircraft in line with the pen 166.

The operation of the pen servo will now be considered. At the moment of operation of the change-over switch, the voltages, with respect to earth, of wipers 197 and 198 of the sine-cosine potentiometers 191 and 192 are represented by vectors $b'$ and $c'$ in Figure 12. The sum of these vectors is given by the length of vector 187, which, as stated above, represents a fixed voltage of 75 volts and also represents the length of the radius of the chart. Thus the amplifier 173, which prior to the de-energisation of the change-over relay 165 had a 75 volt bias applied thereto from terminal 174, receives from wipers 197 and 198, at the moment of operation of the change-over switch, voltages which add up to 75 volts and which, like the bias voltage, are in phase opposition with the output of the "answer" potentiometers 172 of the pen servo. There is therefore no immediate change in the position of the pen.

Since the input voltages to the sine-cosine potentiometers 191 and 192 are thereafter always proportional to the east-west and north-south distances of the aircraft from the point represented at the chart centre, the voltages at wipers 197 and 198 will decrease as these distance decrease, that is, as the aircraft moves further into the chart area. The sum of the voltages at wipers 197 and 198 will continue to be representative at any moment of the distance of the aircraft from the said point. Whenever a difference exists between the sum of the voltages at wipers 197 and 198, and the voltage fed back by the wiper of potentiometer 172, the motor 171 rotates, displacing the pen 166 and driving the wiper of potentiometer 172 until the difference no longer exists. The displacement of the pen 166 will continue in this manner until the aircraft leaves the area represented on the circular chart, when the change-over relay 165 will again be energised, and the apparatus will operate in the same manner as before the entry of the aircraft into the said area.

The displacement of the pen, combined with the rotation of the circular chart, produces an accurate record of the course of the aircraft on the circular chart.

Figure 13 shows how the bearing servo, comprising the amplifier 140, motor 141, generator 142 and gearbox 143, of Figure 9 is used to provide the pilot with a radio-compass indication of the relative bearing of the point 136 (Fig. 10) on the circular chart 135 from the aircraft.

In Figure 13, there is shown the sine-cosine resolver of Figure 9, including the stator coils 137 and 138, and the rotor winding 139 which is mechanically coupled to the shaft of the bearing servo (Fig. 9). As previously explained, when the initial adjustment to take into account the "deviation" at the point on the conic chart representing point 136 has been made, the setting of the rotor 139 thereafter represents the true bearing of the pen 20 from the said point. The true bearing of the pen 20 from the said point is algebraically added to the azimuth angle of the aircraft, by means of a differential synchro system, to give the relative bearing of the said point from the aircraft.

The rotor 201 of a double-wound unit of the differential synchro system is also geared to the bearing servo (Fig. 9) and also assumes an angular setting representing the true bearing of the pen 20 from the said point. The windings of the stator 202 of the double-wound unit are energised by currents from the stator 203 of a transmitter unit, the rotor 204 of which is energised from an A. C. source and is given a rotation determined by the azimuth system of the aircraft. The values of the voltages transmitted from stator 203 to stator 202 of the double-wound unit are therefore representative of the instantaneous heading of the aircraft.

The voltages appearing at the rotor windings 201 at any instant will therefore correspond to the relative bearing of the point represented by the centre of the circular chart from the aircraft. These voltages are used to energise the windings of the stator 205 of a receiver unit. The rotor 206 of this unit forms part of an automatic direction finding servo unit which includes an amplifier 207, a motor 208, a generator 209 and a gearbox 210.

Voltages induced in the rotor 206 are applied through the amplifier 207 to the motor 208, the shaft of which is mechanically coupled to the rotor 206 of the receiver unit. The connections are such that the motor rotates until it has driven the rotor to its zero-signal position, i. e. until the rotor has turned through an angle equal to the alegbraic sum of the rotations applied to the rotor 201 and the rotor 204. The rotor 206 therefore takes up a position corresponding to the relative bearing of the point represented by the centre of the circular chart from the aircraft. The generator 209, driven by the motor 208, provides a velocity feed-back voltage for the amplifier 207.

The rotor 211 of a transmitter unit of a further synchro system is also mechanically coupled to the shaft of the motor 208, and also takes up a position corresponding to the relative bearing of the said point from the aircraft. The stator 212 of this transmitter unit provides voltage signals for the stator 213 of a remotely-positioned receiver unit, the rotor 214 of which is destined to operate the pilot's radio compass indicator system.

What I claim is:

1. A multi-chart apparatus for indicating the course of a craft which may pass from an area represented on a first chart into a predetermined area represented on a second chart, comprising a support for a first chart, a separate indicating element for co-operation with this first chart, means responsive to the movement of the craft to cause relative displacement of the first chart and its indicating element, a support for a circular chart, a separate indicating element for co-operation with this circular chart, said circular chart and its indicating element being capable of relative rotation about the centre of the chart and the said element being capable of linear movement from the circumference of the chart to its centre, computing means which can be given an initial condition representing the initial position of the craft with respect to a reference point represented by the centre of the circular chart and is adapted to have this condition modified as a function of the subsequent movement of the craft so as to obtain electric signals which are representative of the distance and bearing of the craft from the said point, means controlled by the signals representing the said distance and serving to maintain the indicating element of the circular chart inoperative with respect to that portion of the chart surface representing the predetermined area until the craft enters the predetermined area, and further means capable of producing the relative rotation of the circular chart and its indicating element in accordance with the said bearing in such a manner that, when the craft reaches a point on the boundary of the said predetermined area, the indicating element of the circular chart is in line with the corresponding bearing on said chart and thereafter is displaced in accordance with the speed and direction of any movement of the craft within the predetermined area represented on the said circular chart.

2. A multi-chart apparatus according to claim 1, wherein the further means capable of producing the relative rotation of the circular chart and its indicating element comprises switching means serving for one condition thereof to apply to an electromechanical servo system signals which are representative of the position of the craft when it is outside the area represented on the circular chart, and, for another condition thereof, to apply to said servo system signals representing the speed and direction of movement of the craft when the latter is inside the said area.

3. A multi-chart apparatus according to claim 1, including a first computing means adjustable as a function of the change of position of the indicating element pertaining to the first chart so as to compute the distance of the craft from the said reference point, a second computing means adapted to be conditioned by the first computing means in accordance with the position of the craft when the craft enters the area represented on the circular chart and thereafter to compute the position of the craft with respect to the said reference point as a function of the speed and direction of movement of the craft, and means controlled by the first computing means enabling the second indicating element to operate under the control of the second computing means when the craft is within the area represented on the circular chart.

4. A multi-chart apparatus according to claim 1, for use when the first chart is based on a conic projection, including manually operable means for modifying the computing means in accordance with the angular relationship between the meridian passing through the centre of the circular chart and a line parallel to a side of the first chart and passing through the said centre, so that the computing means computes the true bearing of the craft from the point represented by the centre of the circular chart.

5. A multi-chart apparatus according to claim 4, in which the computing means includes a magnetic resolver the stator coils of which are adapted to be energised by voltages representing the co-ordinates of the craft with respect to mutually perpendicular reference axes passing through the said point represented by the centre of the circular chart, and manually operable means for rotating the said stator coils so that the rotor of the resolver tends to assume an angular position representative of the true bearing of the craft from the said point.

6. A multi-chart apparatus for indicating the course of a craft which may pass from a first area represented on a first chart into a second area which is represented on a second chart and also on the first chart, comprising supports for two separate charts, a separate indicating element for co-operation with each chart, a first translating means responsive to electric signals to cause relative movement of the first chart support and its indicating element, means applying to said first translating means electric signals which are representative of the movement of the craft, computing means controlled in accordance with the position of said indicating element pertaining to the first chart and adapted to provide electric signals which are representative of the position of said first chart indicating element with respect to that portion of the first chart which represents the second area, a second translating means responsive to the application thereto of electric signals to control the relative position of the second chart support and its indicating element, and means applying the said signals, which are representative of the position of said element pertaining to the first chart, to said second translating means, whereby said indicating element pertaining to the second chart is maintained on the boundary of the latter when the craft is outside the second area and begins to indicate the course of the craft on the second chart when the craft enters the second area.

7. Apparatus for indicating the course of a craft which may pass from a given area into a predetermined area which comprises a first chart and a second chart respectively representing said areas, indicating elements respectively disposed in indicating relation to said charts, means for supporting said charts and said indicating elements for relative movement of the respective charts and their indicating elements with respect to each other, first and second translating means respectively connected to said first and second chart supporting means and their respective indicating elements and operable to cause relative movement of the respective charts and their indicating elements with respect to each other, means providing a source of data representative of the movement of said craft in said given area and operatively connected to said first translating means to cause relative movement of said first chart and its indicating element with respect to each other with components of said movement along coordinates of said first chart while said craft is moving in said given area, means providing a source of data representative of a component of the movement of said craft in a given direction in said given area and operatively connected to said second translating means to cause relative movement of said second chart and its indicating element with respect to each other along a selected coordinate of said second chart parallel to a given coordinate of said second chart corresponding to said component of the movement of said craft in said given direction while said craft is moving in said given area, and means providing a source of data representative of the movement of said craft in said predetermined area and operatively connected to said second translating means to cause relative movement of said second chart and its indicating element with respect to each other with components of said movement along coordinates of said second chart while said craft is moving in said predetermined area.

8. Apparatus for indicating the course of a craft which may pass from a given area into a predetermined area which comprises a first chart and a second chart respectively representing said areas, indicating elements respectively disposed in indicating relation to said charts, means for supporting said charts and said indicating elements for relative movement of the respective charts and their indicating elements with respect to each other, means providing a source of data respresentative of the movement of said craft over said areas, a first translating means and a second translating means operatively connected to and operable in response to operation of said data means and respectively operatively connected to said first and second chart supporting means and their indicating elements and operable to cause relative movement of the respective charts and their indicating elements with respect to each other, computing means operatively connected to and responsive to said data means to provide further data representing the position of said craft with respect to a boundary of said predetermined area, a first means operatively connected to said computing means and responsive to operation of said computing means providing said further data and operatively connected to said second translating means for effecting operation of said second translating means to cause relative movement of said second chart and its indicating element with respect to each other along a selected coordinate of said second chart parallel to the coordinate of said second chart representing the boundary of said predetermined area while said craft is moving in said given area, and a second means operatively connected to said computing means and responsive to operation of said computing means providing said further data and operatively connected to said second translating means for effecting operation of said second translating means to cause relative movement of said second chart and its indicating element with respect to each other with components of said movement along coordinates of said second chart upon movement of said craft in said predetermined area.

9. Apparatus for indicating the course of a craft which may pass from a given area into a predetermined area which comprises data means operable to represent components of the movement of said craft over said areas corresponding respectively to coordinates determining the positions of said craft in the respective areas, a first chart and a second chart respectively representing said areas and each having coordinates respectively corresponding to the coordinates of the respective areas, indicating elements respectively disposed in indicating relation to said charts, means for supporting said charts and said indicating elements for relative movement of the respective charts and their indicating elements with respect to each other along said coordinates, a first translating means and a second translating means respectively connected to said first and second chart supporting means and the respective indicating elements and operable to cause relative movement of said charts and the respective indicating elements with respect to each other along said coordinates of the respective charts, means operatively connecting said data means to said first translating means for effecting movement of said first chart and its indicating element with respect to each other along coordinates corresponding to the components of movement of said craft in said given area, computing means operatively connected to and operable in response to operation of said data means representing the component of the movement of said craft in said given area parallel to a given coordinate of said area, a selected coordinate of said second chart having a direction corresponding to said given coordinate of said given area, means operatively connecting said computing means to said translating means associated with said second chart for effecting relative movement of said second chart and its indicating element with respect to each other along said selected coordinate of said second chart while said craft is moving in said given area, and means operatively connecting said computing means to said translating means associated with said second chart for effecting relative movement of said second chart and its indicating element with respect to each other along the coordinates of said second chart upon movement of said craft in said predetermined area represented by said second chart.

10. Apparatus as claimed in claim 9 in which said computing means includes said translating means pertaining to the first chart and computes the position of the craft at any moment with respect to the selected second area.

11. A multi-chart apparatus according to claim 9, in which said computing means includes switching means, a movable member controlling the operation of said switching means, and electromechanical means arranged to move said member as a function of the velocity of the craft in a direction perpendicular to a predetermined boundary of the second chart, said switching means serving to initiate relative movement of the second chart and its indicating element such as to indicate the course of the craft within the area represented on the second chart when the craft crosses said boundary to enter the area represented on the second chart.

12. A multi-chart apparatus according to claim 9, in which said computing means includes a movable member, means for moving said member as a function of the velocity of the craft in a direction perpendicular to a predetermined boundary of the second chart, means including said movable member for obtaining an electric potential difference which is a function of the position of said craft in said direction with respect to a chosen reference point, a further movable member, means for moving said further member as a function of the velocity of the craft in a direction perpendicular to a further predetermined boundary of the second chart, means including said further member for obtaining an electric potential difference which is a function of the position of the craft in this further direction with respect to a chosen reference point, and means responsive to the application thereto of said electric potential differences for initiating relative movement of the second chart and its indicating element such as to indicate movement of the craft within the area represented on said second chart when the craft crosses either of the said two boundaries to enter the latter area.

13. A multi-chart apparatus according to claim 9, in which said computing means includes two potentiometers, means for moving the wipers of said potentiometers as functions of the velocity of the craft in two mutually perpendicular directions respectively, whereby there are obtained electrical potential differences which vary as functions of the position of the craft with respect to the area represented on the second chart, and means responsive to the application thereto of said electric potential differences for initiating relative movement of said second chart and its indicating element such as to indicate movement of the craft within the area represented on the second chart when the craft enters said area represented on said second chart.

14. A multi-chart apparatus according to claim 9, in which said first and second charts are on the same scale and represent adjacent areas and in which said computing means effects displacement of said indicating element pertaining to the second chart by said second chart translating means, before the entry of the craft into the area represented on the second chart, in accordance with the velocity of the craft in a direction parallel to the common boundary of the charts.

15. A multi-chart apparatus according to claim 9, in which said first and second charts are on the same scale and represent adjacent areas, including means controlled by said computing means for causing operation of said second chart translating means to position said second chart indicating element on the boundary of the second chart, when the craft is outside the area represented on the second chart, at a point determined by the component of the position of the craft parallel to said given coordinate of said given area, and switching means actuated by said computing means for rendering said positioning means effective pending the entry of the craft into the area represented on the second chart and effecting operation of said second chart indicating element when said craft enters said predetermined area represented on said second chart.

16. A multi-chart apparatus as claimed in claim 9, in which said charts are roller charts and in which said translating means includes means for displacing each chart with respect to the corresponding indicating element in accordance with a first component of the velocity of said craft, and means for displacing each indicating element with respect to the corresponding chart in accordance with a second component of the velocity of said craft, and switching means, controlled by said computing means, for preventing operation of said means for displacing said indicating element pertaining to the second chart until the craft enters the area represented on the second chart.

17. A multi-chart apparatus as claimed in claim 12, in which said charts are rectangular charts, the boundary of the area represented on the second chart being obliquely disposed with respect to the boundary of the area represented on the first chart, comprising manually operable means for modifying said computing means in accordance with the angular relationship between the boundaries of the areas represented on the first and second charts so as to cause said computing means to provide electric signals representative of the co-ordinates of the position of said craft with respect to axes parallel to the appropriate sides of the boundary of the area represented on said second chart.

18. A multi-chart apparatus according to claim 17 in which the means for modifying said computing means includes two drum-type potentiometers, each having two wipers which are adapted to provide output voltages representative of the sine and cosine respectively of the angle of rotation of their wipers, manually operable means for causing a relative rotation of said wipers and their respective drums to adjust said angular relationship, said computing means applying across the potentiometers potential differences representative of the co-ordinates of the craft with respect to axes parallel to the appropriate sides of the boundary of said first chart, and means for algebraically summing the output voltages from the sine wiper of each potentiometer and the cosine wiper of the other potentiometer to provide electric signals representative of the co-ordinates of the craft with respect to axes parallel to the appropriate sides of the boundary of the second chart.

19. A multi-chart apparatus according to claim 9, wherein said computing means serves to compute the distance and bearing of the craft from a predetermined point represented on the second chart.

20. Apparatus for indicating the course of a craft which may pass from a given area into a predetermined area having a common boundary with said given area which comprises a first chart and a second chart respectively representing said areas, indicating elements respectively disposed in indicating relation to said charts, means for supporting said charts and said indicating elements for relative movement of the respective charts and their indicating elements with respect to each other, means providing a source of data representative of the movement of said craft over said areas, a first translating means and a second translating means respectively operatively connected to said first and second chart supporting means and their indicating elements and operable to cause relative movement of said charts and the respective indicating elements with respect to each other, switch actuating means operatively connected to and operable to a given position in response to operation of said first translating means to different positions producing corresponding positions of said first chart indicating element relative to a coordinate of said first chart representing said common boundary, switch means actuated by said switch actuating means in said given position of said switch actuating means for connecting said data means to said first translating means to cause relative movement of said first chart and its indicating element with respect to each other with components of said movement along coordinates of said first chart and for concomitantly connecting said data means to said second translating means to cause relative movement of said second chart and its indicating element with respect to each other along a selected coordinate of said second chart representing said common boundary while said craft is moving in said given area, and switch means actuated by said switch actuating means in a position of said first translating means producing a position of said first chart indicating element adjacent said coordinate of said first chart representing said common boundary for connecting said data means to said second translating means to cause relative movement of said second chart and its indicating element with respect to each other with components of said movement along coordinates of said second chart upon movement of said craft in said predetermined area.

21. A multi-chart apparatus for indicating the course of a craft which may pass from a first area represented on a first chart into a second area which is represented on a second chart and also on said first chart comprising supports for two separate charts, a separate indicating element for cooperation with each chart, a first translating means responsive to electric signals to cause relative movement of said first chart support and its indicating element, a second translating means responsive to electric signals to cause relative movement of said second chart support and its indicating element; first means connected to said first translating means for applying to said first translating means electric signals which are representative of the components of the movement of the craft in said first area, switch actuating means operatively connected to and operated by said first translating means to a given position for different positions of said first chart indicating element relative to said first chart corresponding to different positions of said craft within said first area, said switch actuating means being operated by said first translating means to another position concomitantly with movement of said craft out of said first area, switch means actuated by said switch actuating means and in said given position of said switch actuating means connecting said first electric signal means to said second translating means for applying to said second translating means electric signals representing the component of the movement of said craft in said first area in a given direction corresponding to the direction of a selected coordinate of said second chart to cause relative movement of said second chart and its indicating element with respect to each other along said selected coordinate while said craft is moving in said first area, second means providing electric signals representing components of the movement of said craft in said second area, and switch means actuated by said switch actuating means and said other position of said switch actuating means connecting second electric signal means to said second translating means to apply to said second translating means electric signals representing the components of the movement of said craft in said second area to cause relative movement of said second chart and its indicating element with respect to each other along coordinates of said second chart upon movement of said craft in said second area.

References Cited in the file of this patent
UNITED STATES PATENTS

| | | |
|---|---|---|
| 2,459,150 | Crane et al. | Jan. 18, 1949 |
| 2,475,314 | Dehmel | July 5, 1949 |
| 2,714,047 | Dehmel | July 26, 1955 |